(12) United States Patent
Borregaard et al.

(10) Patent No.: US 8,873,784 B2
(45) Date of Patent: Oct. 28, 2014

(54) HEARING AID WITH A CASING ELEMENT

(75) Inventors: Sune Pelle Borregaard, Helsinge (DK); Jens Lundby, Smørum (DK); Carsten Rømer, Svendborg (DK)

(73) Assignee: Oticon A/S, Smorum (DK)

( * ) Notice: Subject to any disclaimer, the term of this patent is extended or adjusted under 35 U.S.C. 154(b) by 841 days.

(21) Appl. No.: 13/026,867

(22) Filed: Feb. 14, 2011

(65) Prior Publication Data

US 2011/0200218 A1     Aug. 18, 2011

Related U.S. Application Data

(60) Provisional application No. 61/304,832, filed on Feb. 16, 2010.

(30) Foreign Application Priority Data

Feb. 16, 2010   (EP) ..................................... 10153727

(51) Int. Cl.
*H04R 25/00*     (2006.01)
*H01M 2/10*      (2006.01)

(52) U.S. Cl.
CPC ............. *H01M 2/1044* (2013.01); *H04R 25/65* (2013.01); *Y02E 60/12* (2013.01); *H04R 25/602* (2013.01)
USPC .......................................... 381/324; 381/322

(58) Field of Classification Search
CPC ... H04R 25/602; H04R 25/65; H04M 2/1044; H04M 2/1022; H04M 2/1016

USPC .................................. 381/312, 322, 323, 324
See application file for complete search history.

(56) References Cited

U.S. PATENT DOCUMENTS

| | | | |
|---|---|---|---|
| 4,272,591 A | 6/1981 | Brander | |
| 7,068,804 B2 * | 6/2006 | Batting | ........................ 381/324 |
| 8,254,610 B2 * | 8/2012 | Heerlein et al. | ............... 381/324 |
| 8,270,645 B2 * | 9/2012 | Takeda et al. | ................. 381/324 |
| 2003/0156727 A1 | 8/2003 | Vonlanthen | |
| 2004/0062408 A1 | 4/2004 | Jorgensen | |
| 2005/0259839 A1 * | 11/2005 | Gabathuler | ................... 381/324 |
| 2009/0202092 A1 | 8/2009 | Ruppert | |

FOREIGN PATENT DOCUMENTS

WO     WO 2006/067133 A1     6/2006

OTHER PUBLICATIONS

European Search Report dated Jun. 7, 2010, issued in EP 10 15 3727.2.

* cited by examiner

*Primary Examiner* — Jesse Elbin
(74) *Attorney, Agent, or Firm* — Birch, Stewart, Kolasch & Birch, LLP

(57) ABSTRACT

The hearing aid comprises a casing element enclosing electronic components and a battery drawer hingedly connected to the casing element for pivotal movement with respect to the casing element. Bushings in the casing element corresponding to seats in the battery drawer are provided coaxially with the desired pivotal axle and a metal hinge pin is provided coaxially with the desired pivotal axle and extends centrally through holes in the bushings, the battery drawer and the casing parts.

4 Claims, 4 Drawing Sheets

HEARING AID WITH A CASING ELEMENT

This Non-Provisional application claims the benefit under 35 U.S.C. 119(e) to U.S. Provisional Application No. 61/304,832 filed on Feb. 16, 2010 and under 35 U.S.C. 119(a) to Patent Application No. 10153727.2 filed in Europe on Feb. 16, 2010, all of which are hereby expressly incorporated by reference into the present application.

TECHNICAL FIELD

The invention relates to the field of connections between a hearing aid and a part thereof, such as the battery drawer, and specifically addresses the problem of establishing a connection between the battery drawer and the remaining hearing aid, which facilitates easy exchange of the battery drawer.

BACKGROUND ART

US 20040062408 disclose a hearing aid with a casing element enclosing electronic components and a battery drawer hingedly connected to the casing element for pivotal movement with respect to the casing element. The battery drawer aligns, in a first pivotal position, with the casing, and in a second pivotal position it grants access to a battery compartment. The bushings in the casing element correspond to seats in the battery drawer and are provided co-axially with the desired pivotal axle. This hinging of the battery drawer works quite well, but at times the battery drawer may come of in-advertently when handled rough during change of the battery, and further the clicking on of the battery drawer will cause wear to the seats, as they are made from plastic parts without much wear resistance.

Further it is known to provide a usual hinge pin passing through openings in the battery drawer and the casing part. Such a hinge pin being made of steel or iron will ensure, that the battery drawer stays on the remaining hearing aid parts, but it is rather cumbersome to insert the steel pin, as during insertion the battery drawer and the casing are to be held with the tiny holes for the steel pin in perfect alignment, and doing this while at the same time maneuvering the miniature steel pin into place in the holes is not at all an easy task.

It is desired to provide a hearing aid with a battery drawer, which is secured safely to the remaining hearing aid, and at the same time can be readily assembled and dis-assembled there from when the battery drawer needs to be exchanged.

DISCLOSURE OF INVENTION

In order to provide improved functionality of the connection between hearing aid housing and battery drawer a hearing aid with a casing element is provided whereby the casing element encloses electronic components. A battery drawer is hingedly connected to the casing element for pivotal movement with respect to the casing element and, in a first pivotal position, aligns with the casing, and in a second pivotal position grants access to a battery compartment such that the user may extract the battery and insert a substitute battery when the battery drawer is in the second pivotal position. Bushings in the casing element corresponding to seats in the battery drawer are provided co-axially with the desired pivotal axle. According to the invention a metal hinge pin is provided coaxially with the desired pivotal axle and extends centrally through holes in the bushings, the battery drawer and the casing parts. The bushings may be provided in the battery drawer and the seats in the casing element and this choice is left with the skilled person to perform according to design details of the hearing aid. With the metal hinge pin provided on top of the bearing formed by the seats and bushings, it is ensured, that the battery drawer will always remain securely attached to the casing, and further the bushings and seats may be used as a preliminary mounting step of the battery drawer to the casing part, such that the hinge pin may be inserted with the holes in the casing and battery drawer being precisely aligned, and without the user having to hold and position the two items with respect to each other.

In an embodiment of the invention the seats are open to one side in a radial direction with respect to the pivotal axle. By providing the seats with an opening in this direction, the battery drawer is easily and intuitively fastened to the casing, by pressing the seats onto the bushings in a radial direction with respect to the hinge pin or hinge axle.

In an embodiment the seats are provided at each their side of the battery drawer or casing, and the bushings are proved opposed to the seats in the radial direction of the hinge pin. Providing the seats at the two sides ensures a stable and secure initial fastening of the battery drawer to the casing part, and at the same time a precise alignment of the holes for the hinge pin is ensured.

In an embodiment the battery drawer comprise a through going opening for the hinge pin between the bushings or seats, the opening having a circular circumference and a diameter matching the diameter of the hinge pin. This construction allows for very simple and secure manufacture of the items in question.

In all of the drawings a small vignette is enclosed in the lower left corner and this vignette shows the axial orientation of the corresponding drawing but is not part of the invention.

MODE(S) FOR CARRYING OUT THE INVENTION

Figure 1:
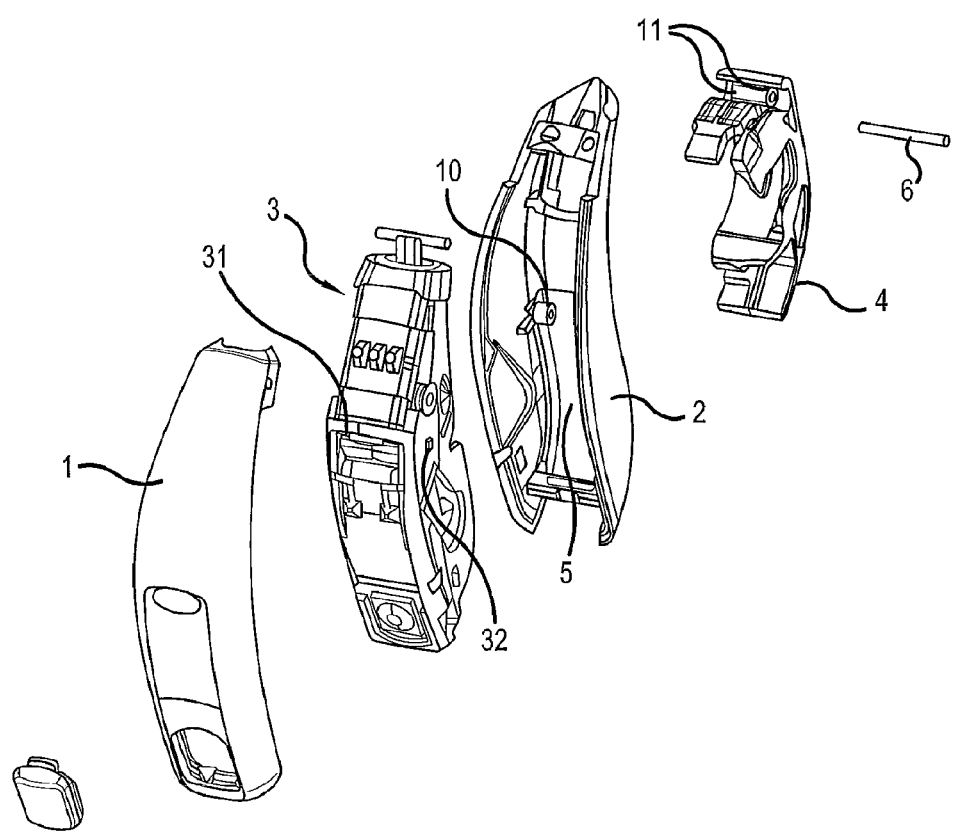
FIG. 1 shows an exploded view of the hearing aid according to an embodiment of the invention.
Figure 2:
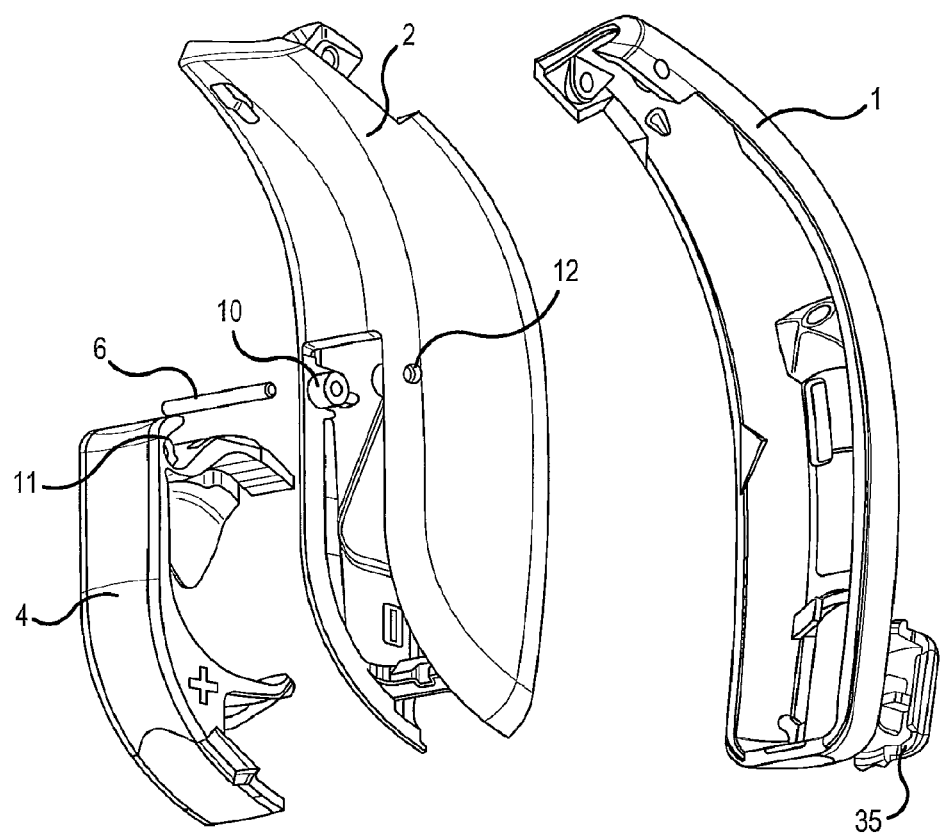
FIG. 2 shows a an exploded view from a different angle of the hearing aid in FIG. 1, and omitting the electronic part.

The hearing aid in FIG. 1 has a casing element 1,2 enclosing electronic components 3 and a battery drawer 4 hingedly connected to the casing element 2 for pivotal movement with respect to the casing element 2. The battery drawer 4 may then, in a first pivotal position, align with the casing 2, and in a second pivotal position grant access to a battery compartment 5. The battery compartment is shown as a part of the casing 2, but it is possible in an alternative to the presented embodiment that the battery compartment is provided with the battery drawer 4. In any event the user may extract the battery and insert a substitute battery when the battery drawer is in the second pivotal position. A metal hinge pin 6 is inserted in corresponding openings in the casing element 2 and the battery drawer 4. This pin 6 forms the pivotal axel for the battery drawer 4. Bushings 10 in the casing element 2 corresponding to seats 11 in the battery drawer 4 are provided co-axially with the metal hinge pin 6. The bushings 10 are shown in the casing element 2 in the embodiment in the figures, but the bushings may be shaped as part of the battery drawer, and corresponding seats formed as part of the casing.

Figure 3:
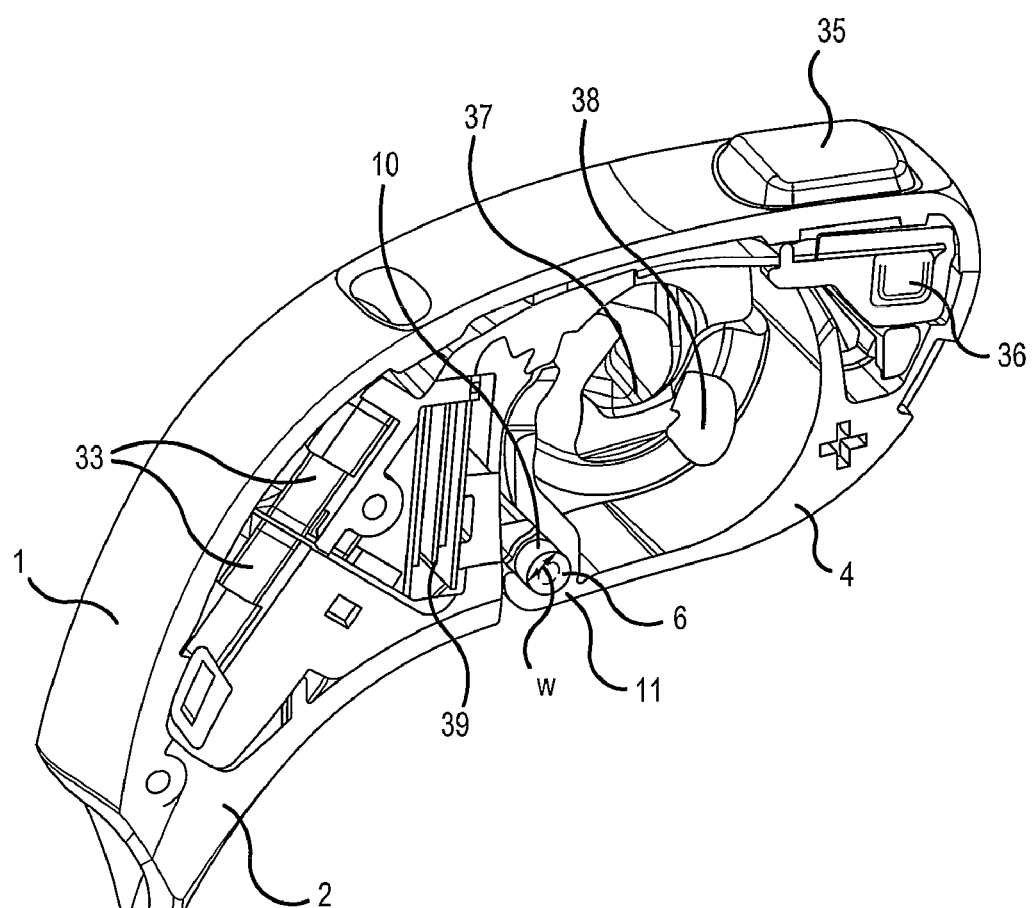
FIG. 3 shows the hearing aid in FIGS. 1 and 2 in assembled form, in a sectional view in 3D elevation.

As seen in FIG. 3, the seats 11 are open to one side in a radial direction with respect to the hinge pin 6. The opening has a width w which is slightly smaller than the diameter of the bushing 10, such that the seat 11 in the battery drawer 4 may be snapped onto the bushing 10 and be maintained in this position and even the relative pivotal movement between the hearing aid casing part 2 and the battery drawer 4 may be realized without the hinge pin 6 in place.

Figure 4:
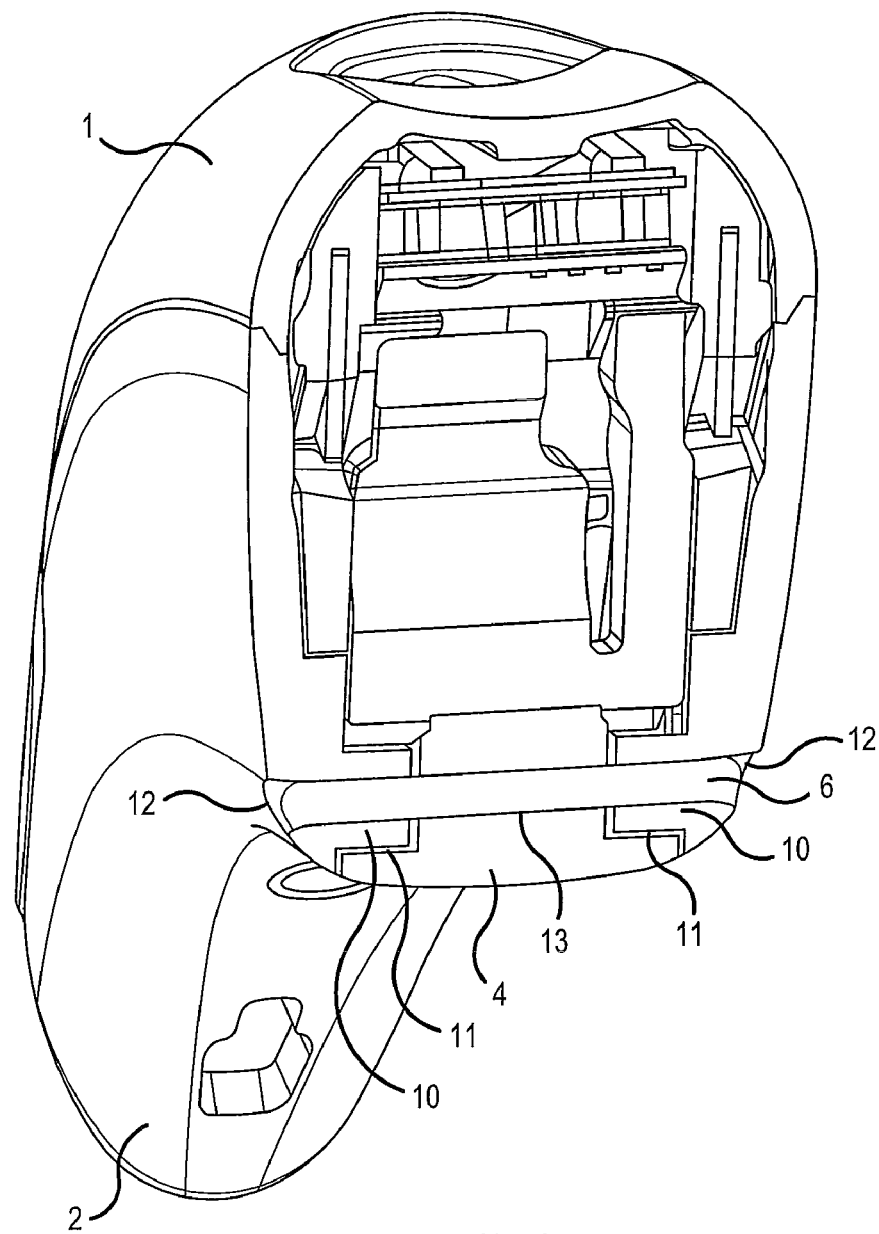
FIG. 4 shows a view of the hearing aid in FIG. 3, but sectioned along a perpendicular plane.

As best seen in FIG. 4, the metal hinge pin 6 is provided coaxially with the desired pivotal axle and is inserted centrally through holes in the bushings 10, holes 13 in the battery drawer 4 and holes 12 in the casing part 2, however, the hinge pin 6 is optional, as the battery drawer 4 may function with the battery drawer 4 being clicked onto the bushings in the casing element 2. The hinge pin provides extra security against the battery drawer coming off the bushings in-advertently. For both hearing care professionals and the end user this extra security is much liked.

As further seen in FIG. 4, the seats 11 are provided at each their side of the battery drawer, and the bushings 10 are proved opposed to the seats 11 in the radial direction of the hinge pin 6. The attachment of the battery drawer to the casing part may then be performed in a radial direction with respect to the pivot axle.

In FIG. 4 it is also seen that the battery drawer 4 between the seats 11 at both sides comprise a through going opening 13 for the hinge pin 6. This opening has a circular circumference and a diameter which matches the diameter of the hinge pin 6.

From FIG. 4 it is also clear that the openings 12 in the casing part 2 for the hinge pin 6 are through going at both sides, such that the hinge pin 6 may be introduced from any side once the battery drawer 4 has been clicked onto the bushings of the casing element.

When a hearing aid according to the disclosed embodiment is to be assembled, the battery drawer is, in an initial step, clicked onto the bushings 10 of the casing 2. In this position the casing and the battery drawer are quite firmly attached to one another and positioned correctly for the pivotal movement, which may be realized, and also with the various holes for the hinge pin being aligned. Following this pre-assembly, the hinge pin is introduced from whichever side the user or hearing care professional prefers, and when the hinge pin is inserted to a position where the two ends thereof are flush with or slightly below the outer surface of the casing the procedures is finished.

The electronics 3 of the hearing aid is shown in FIG. 1. This part comprise a frame element 31,32 with a first frame part 31 and a second frame part 32, where the frame parts are shaped to embrace all of the transducers and a flex-print circuit connecting the same. In FIG. 3 the microphones 33, a wireless coil 36, a button 35 and battery contact springs 37,38 are all shown. Also the hearing aid amplifier 39 is visible. At the front end of the casing 2,1 a connection to the speaker phone (not shown) is provided. The speaker phone is connected to the hearing aid via electric connections and will be placed in or near the hearing aid user's ear canal.

The invention claimed is:

1. Hearing aid with a casing element enclosing electronic components and a battery drawer hingedly connected to the casing element for pivotal movement with respect to the casing element
   whereby the battery drawer, in a first pivotal position, aligns with the casing, and in a second pivotal position grants access to a battery compartment whereby the user may extract the battery and insert a substitute battery when the battery drawer is in the second pivotal position, and
   where bushings in the casing element corresponding to seats in the battery drawer are provided co-axially with the desired pivotal axle, the seats are open to one side in a radial direction with respect to the pivotal axle, and the opening of the seats having a width that is smaller than the diameter of the bushing;
   wherein a metal hinge pin is provided coaxially with the desired pivotal axle and centrally through holes in the bushings, the battery drawer and the casing parts;
   the through holes in the casing part being provided at both sides of the casing part such that the metal hinge pin when in position is flush with or slightly below an outer surface of the casing part.

2. Hearing aid with a casing element enclosing electronic components and a battery drawer hingedly connected to the casing element for pivotal movement with respect to the casing element
   whereby the battery drawer, in a first pivotal position, aligns with the casing, and in a second pivotal position grants access to a battery compartment whereby the user may extract the battery and insert a substitute battery when the battery drawer is in the second pivotal position, and
   where bushings in the battery drawer corresponding to seats in the casing element are provided co-axially with the desired pivotal axle, the seats are open to one side in a radial direction with respect to the pivotal axle, and the opening of the seats having a width that is smaller than the diameter of the bushing;
   wherein a metal hinge pin is provided coaxially with the desired pivotal axle and centrally through holes in the bushings, the battery drawer and the casing parts; and
   the through holes in the casing part being provided at both sides of the casing part such that the metal hinge pin when in position is flush with or slightly below an outer surface of the battery drawer.

3. Hearing aid as claimed in claim 1 or claim 2, wherein the seats are provided at each their side of the battery drawer or casing, and the bushings are proved opposed to the seats in the radial direction of the hinge pin.

4. Hearing aid as claimed in claim 3, wherein the battery drawer between the bushings or seats comprise a through going opening for the hinge pin the opening having a circular circumference and a diameter matching the diameter of the hinge pin.

* * * * *